T. M. CREPAR.
CAR WHEEL.
APPLICATION FILED FEB. 14, 1908.
899,483. Patented Sept. 22, 1908.
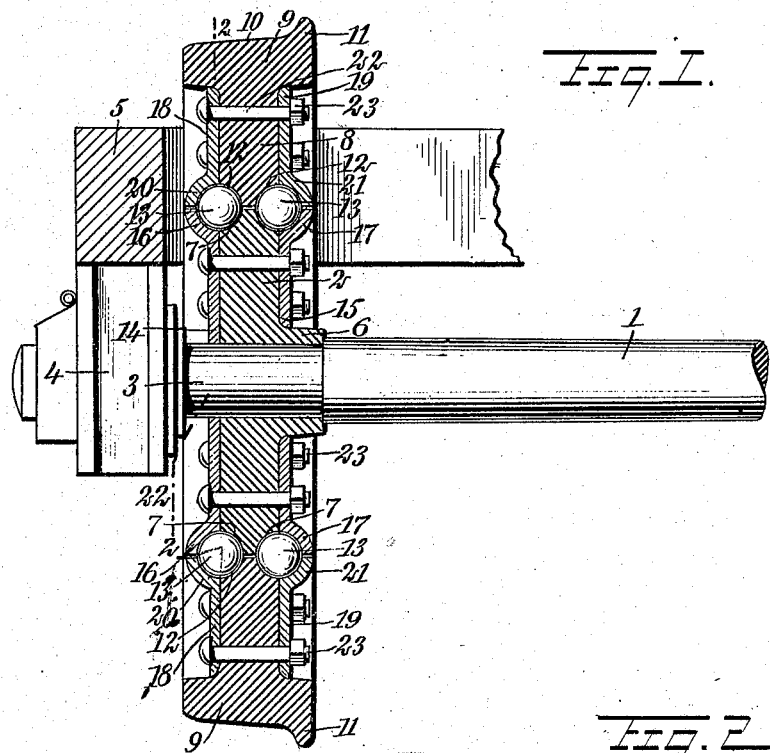
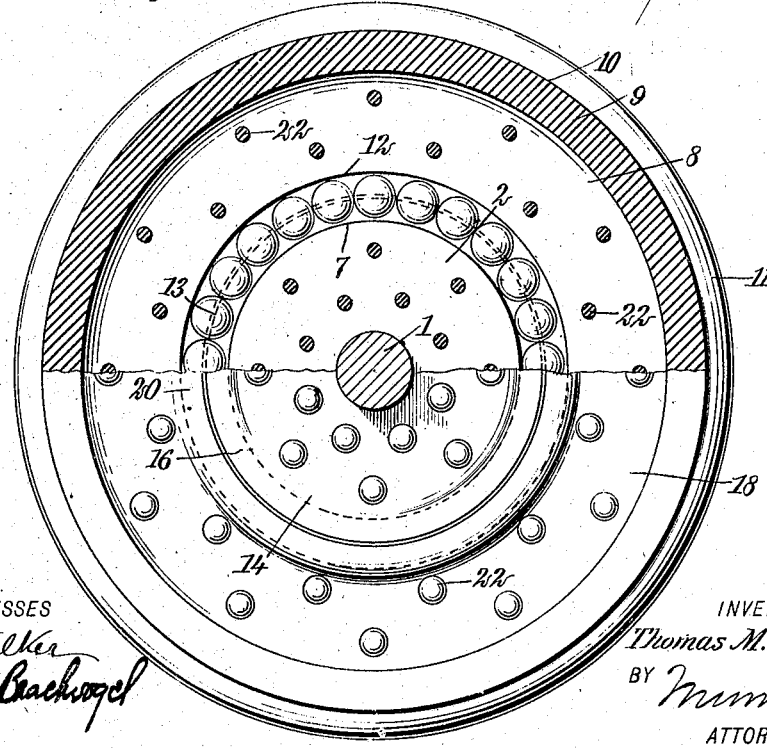
WITNESSES
H. Walker
John K. Brachvogel
INVENTOR
Thomas M. Crepar
BY Munn & Co.
ATTORNEYS

UNITED STATES PATENT OFFICE.

THOMAS MORTIMER CREPAR, OF FARGO, NORTH DAKOTA, ASSIGNOR OF ONE-FOURTH TO GEORGE JOHN HAHN, OF MOORHEAD, MINNESOTA, AND ONE-FOURTH TO SHELDON F. CORNELL, OF FARGO, NORTH DAKOTA.

CAR-WHEEL.

No. 899,483.   Specification of Letters Patent.   Patented Sept. 22, 1908.

Application filed February 14, 1908. Serial No. 415,820.

*To all whom it may concern:*

Be it known that I, THOMAS MORTIMER CREPAR, a citizen of the United States, and a resident of Fargo, in the county of Cass and State of North Dakota, have invented a new and Improved Car-Wheel, of which the following is a full, clear, and exact description.

This invention relates to car wheels, and more particularly car wheels each of which includes a hub section and revoluble thereupon a rim section, the sections being formed with race ways therebetween in which are arranged bearing balls or rollers held in position by face plates upon the sections, and also forming raceways.

The object of the invention is to provide a simple, strong and inexpensive car wheel adapted to be mounted with another similar wheel rigidly upon a car axle, and having means for permitting the independent movement of each wheel rim in rounding curves.

A further object of the invention is to provide a car wheel adapted to be mounted with another similar wheel upon an axle, and having a hub section rigid with the axle and a rim section carried by the hub section and movable relatively thereto, bearing balls or rollers being interposed between the sections.

The invention consists in the construction and combination of parts to be more fully described hereinafter and particularly pointed out in the claims.

Reference is to be had to the accompanying drawings forming a part of this specification, in which similar characters of reference indicate corresponding parts in all the views, and in which—

Figure 1 represents a part of a car axle which has a journal at one end mounted in a journal box, and shows in vertical section a car wheel of my invention mounted thereupon; and Fig. 2 is a side elevation, partly in section on the line 2—2 of Fig. 1.

Before proceeding to a more detailed explanation of my invention, it should be understood that railroad and other cars are usually mounted upon wheels carried in pairs upon suitable axles, one wheel being rigidly mounted at each end of the axle which presents a journal on the outside of the wheel arranged in a suitable journal-box. As both wheels of the pair on the axle are rigid with the axle there is no possibility of independent movement of the wheels with respect to one another; consequently, in rounding a curve there is considerable wear upon the wheels owing to the fact that the wheel at the outside of the curve must travel faster than the wheel at the inside of the curve, and as the outer wheel cannot revolve faster than the inner wheel a certain amount of sliding is inevitable. It is held that this disadvantage is offset by the advantage of being able in manufacturing to shrink the wheels firmly upon the axle.

In my invention I provide a hub section shrunk or otherwise suitably mounted upon the axle at an end thereof and rigid with the same. The rim section is revolubly located upon the hub section and is free to move with respect thereto, being carried upon bearing balls or rollers arranged in suitable race-ways and interposed between the wheel sections. The axle has the usual journal at the outside of the wheel, which is adapted to be revolubly mounted in a journal-box of preferred or common form. By means of this arrangement the rim sections of the wheels at the ends of the axle can revolve at different rates with respect to one another and to the axle, and thereby the speed of revolution in rounding curves adjusts itself automatically to the location of the wheels at the inner or outer sides of the curve, respectively. In this way the greater part of the wear incident to the sliding of one wheel or the other upon the rail is obviated and at the same time the axle itself can revolve in the journals, and this additional revoluble mounting increases the flexibility of the change in the relative rates of revolution of the wheels and the axle. Owing to the interposition of the bearing balls or rollers between the wheel sections, the friction between the rim section and the hub section will be less than that between the journal and the journal brasses; consequently, under normal conditions the axle will not revolve in its bearings and thus the wear of the bearing brasses is avoided. Furthermore, the bearings cannot heat and there is for this reason no danger of hot boxes and fires due to ignited waste and oil in the journal boxes.

Referring more particularly to the drawings, 1 represents a car axle of the usual type having mounted thereupon at one end a wheel hub section 2. The hub section 2 is preferably shrunk upon the axle in the usual manner. The axle 1 is extended beyond the hub section 2, in the form of a journal 3 of the ordinary type and adapted to be mounted in a journal-box 4 carried by the car-frame 5. The hub section 2 has the usual inner hub extension 6, and is provided at the opposite peripheral edges with annular grooves 7, preferably curved in the quadrant of a circle. A rim section 8 is mounted concentrically upon the hub section 2 and is spaced a slight distance therefrom. The rim section 8 has a wheel rim 9 of the usual form, provided with a tread 10 and a flange 11. At the inner edges of the rim section are formed annular grooves 12, preferably in the form of a quadrant of a circle, and registering with the grooves 7 of the hub section. The adjacent grooves 7 and 12 form semicircular raceways for bearing balls 13. It will be understood that instead of bearing balls 13, bearing rollers may be employed and in that case the grooves forming the race-ways will be suitably shaped to receive the rollers.

Annular face plates 14 and 15 are mounted respectively on the outer and inner faces of the hub section 2, and have annular flanges 16 and 17 respectively, curved in the form of a quadrant of a circle and extending over the race-way formed by the grooves 7 and 12. Annular face plates 18 and 19 are mounted on the inner and outer faces respectively of the rim section 8, and have annular flanges 20 and 21 respectively, curved in a quadrant of a circle and extending over the race-way presented by the wheel sections. The adjacent flanges of the face plates form semicircular race-ways, registering with the corresponding race-ways presented by the sections of the wheel and serve to hold the bearing balls in position. The face plates are held in position by means of bolts 22 and nuts 23, passing through suitable openings in the face plates and wheel sections.

As the face plates are removable, the bearing balls or rollers between the wheel sections can be easily replaced when worn or broken, by simply removing the face plates at one side of the wheel, the face plates performing the further office of holding the wheel sections in proper position, one upon the other, through their engagement with the rollers which also engage both sections of the wheel, as will be clearly understood from the description and the drawings.

Having thus described my invention, I claim as new and desire to secure by Letters Patent:

1. A car wheel, comprising a hub section, a rim section thereupon, said sections having registering grooves forming a raceway, a removable face plate upon each of said sections, said plates having outwardly curved flanges presenting registering grooves constituting a raceway extending over said first raceway, and bearing rollers between said raceways.

2. A car wheel comprising a hub section adapted to be rigidly mounted upon a revoluble axle, said hub section having an annular groove, a rim section upon said hub section and having an annular groove registering with said first groove and forming therewith a race-way, bearing rollers in said race-way, and face plates removably mounted upon said hub section and said rim section respectively, and extending over said race way to hold said rollers in position therewithin.

3. A car wheel comprising a hub section adapted to be rigidly mounted upon an axle having a journal, said journal being adapted to be revolubly mounted in a journal-box, said hub section having an annular groove at an edge thereof, a rim section upon said hub section and having an annular groove registering with said first groove and forming therewith a race-way, bearing rollers in said race-way, and face plates removably mounted respectively, upon said sections, and having flanges extending over said race-way, and constituting together a second race-way engaging said rollers to hold the same in position.

4. A car wheel comprising a hub section adapted to be rigidly mounted upon an axle having a journal, said journal being adapted to be revolubly mounted in a journal box, said hub section having annular grooves at opposite peripheral edges, a rim section upon said hub section and having annular grooves at the inner edges thereof, said grooves of said rim section registering with said grooves of said hub section and forming therewith race-ways, bearing rollers in said race-ways, and face plates removably mounted upon said hub section and said rim section at the opposite sides thereof and having flanges, adjacent flanges of said face plates constituting race-ways serving to hold said rollers in position.

In testimony whereof I have signed my name to this specification in the presence of two subscribing witnesses.

THOMAS MORTIMER CREPAR.

Witnesses:
H. P. LOUGH,
MARJORY HARDY.